United States Patent [19]

Haynes

[11] 4,450,820

[45] May 29, 1984

[54] ENGINE FUEL CONDITIONER AND MONITOR

[76] Inventor: Hendrick W. Haynes, P.O. Box 66152 (250 SW. 176th St.), Seattle, Wash. 98166

[21] Appl. No.: 367,378

[22] Filed: Apr. 12, 1982

Related U.S. Application Data

[63] Continuation-in-part of Ser. No. 266,942, May 26, 1981, abandoned, which is a continuation of Ser. No. 50,198, Jun. 20, 1979, abandoned.

[51] Int. Cl.³ .............................................. F02M 37/20
[52] U.S. Cl. ..................................... 123/514; 123/516; 123/541; 73/114
[58] Field of Search ............... 123/514, 516, 518, 510, 123/541, 41.31; 261/DIG. 67; 73/116, 113, 114, 119 A, 181, 183

[56] References Cited

U.S. PATENT DOCUMENTS

| 2,215,469 | 9/1940 | Janssen | 125/516 |
| 2,878,889 | 3/1959 | Gilbert | 123/516 |
| 3,164,985 | 1/1965 | Arnot | 73/114 |
| 3,817,273 | 6/1974 | Erwin | 123/516 |
| 4,050,295 | 9/1977 | Harvey | 73/114 |
| 4,195,608 | 4/1980 | Sanada et al. | 123/514 |
| 4,212,195 | 7/1980 | Young | 73/114 |

FOREIGN PATENT DOCUMENTS 1573703 8/1980 United Kingdom ................ 123/514

Primary Examiner—Ira S. Lazarus
Assistant Examiner—Magdalen Moy
Attorney, Agent, or Firm—Harvey B. Jacobson

[57] ABSTRACT

Intake fuel supplied to a conditioning tank is mixed therein with engine heated fuel returned from a fuel injector to which mixed fuel from the tank is fed. The mixed fuel in the conditioning tank is degassed by atmospheric venting through a hydrostatic liquid column rising to a level above the conditioning tank.

16 Claims, 5 Drawing Figures

ENGINE FUEL CONDITIONER AND MONITOR

CROSS-REFERENCE TO RELATED APPLICATIONS

This is a continuation-in-part of an application Ser. No. 266,942 filed May 26, 1981, Engine Fuel Systems and Fuel Flow Monitoring, now abandoned, which in turn is a continuation of an application Ser. No. 50,198, filed June 20, 1979 entitled Fuel Flow Monitoring Device for Engines, now abandoned. Furthermore, the present application is related to application Ser. No. 394,533, filed Dec. 3, 1982, entitled Fuel Consumption Monitor, which is a continuation-in-part of application Ser. No. 199,206, filed Oct. 21, 1980, in which the applicant is a co-inventor.

FIELD OF THE INVENTION

The present invention relates to a device and system which accurately samples and displays, for user consideration, the output of a diesel fuel flow transducers and also transducers measuring engine RPMS and vehicular speed. The device is particularly related to a system whose accurate sampling and measurement of diesel fuel flow is dependent upon system fuel conditioning.

PRIOR ART

The injector rail of the diesel engine is one section of a fuel circulation loop which beings at the fuel supply source, continues to the injector rail and then loops back to the supply source. When diesel fuel is pumped to the injector rail only a portion passes through the injectors and is combusted. The remainder of the fuel picks up a significant amount of heat, combustion gases and combustion particulates and is passed back to the fuel supply source.

Problems arise in trying to measure the quantity of fuel that actually passes through the injectors to be combusted.

One problem is encountered when fuel is returned directly to the supply source. In an idealized case a flow sensor will be needed in each of the injector supply and injector return lines. The actual fuel consumption can only be found taking the difference between the respective sensor readings.

There is also a problem of combustion gases and particles leaking through the injectors and into the fuel stream. These gases and foreign matter are present in varying amounts in different engines. At the very least, the entrained gases can cause erroneous sensor readings. If the gases and particulates are not brought out of the fuel stream, they can cause an interruption in engine output power.

Another problem arises because the viscosity of diesel fuel is prohibitively responsive to changes in fuel temperature. The differential sensing system or any measurement system used must be constructed to compensate for changes in diesel fuel viscosity, diesel fuel volume expansion and flow sensor error at flow rate, fuel temperature, viscosity and density. Ideally, the actual fluctuations in fuel viscosity are minimized by balancing the temperatures of fuel fresh from the supply source through a specially designed reservoir and therein mixing the HCT fuel returning from the injector rail. When this is done, the diesel engine performance becomes predictable within an acceptable margin and the fuel use data derived with a single fuel flow sensing device as hereinafter disclosed can be reliably used to derive data on engine and vehicular performance, (i.e., a differential sensing system using an input sensor and a fuel "return" sensor must have their errors at large rail circulation flows "track" to yield an acceptable "combined error" at substantially lower fuel consumed aggregate flow. A single sensor supplying a mixing tank as disclosed herein requires only one sensor and that only its error level be defined and controlled at engine consumption demand flow ration. Further with more closely controlled fuel temperature diesel engines can be more closely timed and their fuel injectors more carefully sized to yield higher indicated horsepower, e.g., the engine will receive less compromising in timing and injection nozzle configuration to allow for changes in fuel viscosity, lubricity, temperature, atmospheric pressure, humidity, and engine age. Another problem is that the fuel rail system in meeting the fuel supply demanded to sustain the engine's power, must be pressurized. This pressure compensates for fuel pressure drop in response to the hydraulic circuits resistance to flow. The injector rail fuel flow is controlled by a rail fuel pump which increases the hydraulic circuits or "fuel rail" flow and pressure in response to engine speed and demand. This increased engine demand results in increased rail pressurization and causes the hydraulic circuits lines and hoses to swell, increasing the circuit fuel volume. A sudden "backing off" of engine power by throttle changes or changing in engine load causes fuel volume to "surge," giving wide changes in sensor readings. This masks actual engine fuel usage during engine power changes.

U.S. Pat. No. 1,189,096 to Grunwald has an overflow tank H in FIG. 1, which actually comprises two separate chambers, $h_1$ and $h_2$. The return line from the fuel pump B feeds into the line 3 and chamber $h_2$ and the fuel line K feeds the chamber $h_1$. There is very little thermal communication between the fuel returning through line 3 and the incoming fuel from line K. The Grunwald fuel line K will often times feed directly into the line G to the engine so that the balancing of temperatures between incoming and outgoing fuel is not obtained. Further, no surge damping provision is provided to allow for "stored" release of pressurized fuel in the engine rail system.

U.S. Pat. No. 2,215,469 to Janssen shows an air separator B having a degassing pipe 11. However, it is not the fuel returning from the fuel dejectors which is degassed. This device vents air which has been trapped by a pumping process before the fuel is sent to the engine. This tank does not vent the gases released from the cool intake fuel as it mixes with the relatively hot return fuel. It also does not vent combustion gases from the hot returning fuel. Nor does the tank mix the hot returning fuel with cool intake fuel so that a continuous averaging and stabilizing of fuel temperature between input and return fuel is obtained. Janssen's device does perform a degassing function but it is not the desired degassing function which will achieve the aforementioned desired results. Further, no surge damping provision is made, nor is flow measurement made.

Japanese Pat. No. 47-4843 to Nippon Denso KK discloses a baffle system for the condensation of gas vapors. The system is designed for the utilization of gas vapors in combustion. Neither the baffle tank nor the fuel tank in this patent is interposed between the fuel supply and fuel return lines from an engine so that an overall fuel conditioning can be performed, and fuel thereto be measured.

U.S. Pat. No. 3,672,394 to Erwin discloses a degassing tank. The structure of the tank shown in FIG. 2 and FIG. 8 is distinct in that the tank has a float which regulates a discharge into a combination fuel line and fuel return line 12. The schematic of FIG. 1 shows that only one line from the tank passes fuel to the combination fuel line and fuel return line. The tank does not achieve a mixing effect between incoming and outgoing fuels because it is intermittently metered as hot pulses of fuel into the fuel rail engine input line. The pulsed return input into the engine input also causes a stratification of fuel temperature in the fuel line and therefore also causes viscosity and density changes which will impact fuel metering differently (and therefor non-uniform cylinder pressures), to the various engine cylinders, as well as a degree of fuel atomization (and therefore combustion pressure rise or "combustion timing"). Also, the mixing of hot return fuel with relatively cool input fuel raises the temperature of the input fuel and causes the input fuel to release any entrained air or dissolved gases. Since Erwin routes input fuel directly to the injector rail without passing first through a degasser, the released air and gases are brought directly to the injector rail for random consumption by the separate injectors.

U.S. Pat. No. 3,817,273 to Erwin has a tank structure, as specified in FIG. 2 and the specification, which clearly has one line connected to the fuel and fuel return line. As such, the Erwin tank in this patent must use a regulating device (a float) to meter the fuel into the combination fuel and fuel return line. This regulating device will have inherent problems because of the response time necessary for such a failure prone linkage to activate. This device will give sensor reading fluctuations in response to float cycling caused by engine return line gas and power demand (see previous discussion) rail "unloading" pulsations.

Any invention system which monitors the fuel consumption of a diesel engine driven vehicle will encounter the aforementioned problems in attempting to obtain an accurate reading of fuel consumption. Entrained gases, viscosity changes, combustion gasses, combustion particulates and the requirement for a fuel circulation loop around the injector rail with fuel of predictable and repeatable properties are all problems which must be dealt with. When these problems are dealt with and an accurate reading of fuel consumption (that is fuel-use per unit time) is obtained, other factors which decide the usefulness of such data must also be considered. These factors pertain to the shaping of fuel consumption data into a convenient and meaningful form.

A first factor is that a diesel powered vehicle, i.e., a boat at sea, will encounter cyclical environmental conditions. The boat at sea operates under changing weather, wave and engine conditions. These conditions change at varying rates and the rates of change also change. The usefulness of fuel consumption data as a predictor of vehicle and engine performance is questionable if the time base or interval used to calculate the fuel consumption rate data is lengthy enough to mask rate data which should be considered by the vehicle operator. The usefulness of such rate data is also questionable if the vehicle operator is confronted with every fluctuation which takes place in fuel consumption rate data. For instance, if the boat is encountering heavy seas, the operator would probably not be benefited by a fuel consumption reading as the prop is loaded at the wave trough or bottom and another reading as the prop is unloaded as the vessel is surfing at the peak of a wave. The time interval used for rate calculations must then be sufficiently long to average less meaningful sensor input fluctuations. Yet, the interval used must be short enough to show the user of the rate data a true picture of changing conditions.

A second factor to be dealt with in shaping fuel consumption data into a meaningful form is that the average rate of fuel consumption, over a given time interval, will mos likely change in value. Even through less meaningful fluctuations may be averaged, the building total of input data under changing conditions will bring a certain change in average of data. This change in data average is made more meaningful and apparent to the vehicle operator only if the latest input data is somehow given a greater weight in fuel comsumption computations.

The inventive system which uses fuel consumption averaged over a meaningful time base in coordination with measurements of engine RPMS and vehicle speed should also use the engine RPMS and vehicle speed measurements in accurate time base averaging. Further, the weighting must be stepped to allow meaningful progressive steps which are related to the scaling of natural forces which affect the passage of the vessel through time and the forcesof nature.

OBJECTS AND ADVANTAGES

It is one object of this invention to degass fuel returning from the injector rail of a diesel engine.

It is another object of this invention to provide a means for removing fuel return line flow surges.

It is another object of this invention to provide a means for mixing fuel returning from the injectors with fuel from the supply tank so that an average temperatures and viscosity range of fuel passing back to the injectors in maintained.

It is another object of this invention to dissipate excess heat in the fuel to control fuel temperature at the injectors.

It is another object of this invention to provide a settling tank for the settling of particulate matter carried in fuel returning from the injector rail.

It is an additional object of this invention to accurately measure fuel consumption and thus to provide a means for a more accurate and consistent prediction of diesel engine performance.

It is an additional object of this invention to supply a "fail safe" sensor system that will allow safe operation of the engine if its sensor should jam, without manual intervention.

It is a further object of this invention to provide a fuel consumption monitor capable of displaying to the user the fuel efficiency of a vehicle under changing environmental conditions, for instance, a boat at sea encountering changing weather and vessel load (displacement) conditions.

SUMMARY

In accordance with the present invention, a continually replenishing diesel fuel conditioning tank forms a reservior for fuel in the fuel line between a diesel engine and its fuel supply tank. The conditioning tank is one section of a closed fuel recirculation loop within which fuel is circulated from the tank to the injector rail and the unburned fuel is returned to the tank. Fresh fuel from the supply can be brought to the conditioning tank through a single line having a fuel volume sensor. The relatively cool fuel coming from the fuel supply tank mixes with the fuel returning from the injectors and enhances a cooling of the returning fuel and a balancing or averaging of the temperature of the fuel within the tank so that a consistent viscosity of fuel delivered to the injectors is maintained. The tank is provided with a degassing column which extends to a height sufficiently above the fuel tank so that a gravity flow of fuel from the fuel tank does not rise and pass out of the degassing column. Further, the engine fuel intake and the tank are placed sufficiently below the fuel tank as to allow reliable feeding of the engine across the pressure drop of the sensor even when the fuel tank should run low.

The degassing column will degas both the fuel arriving fresh from the supply tank and fuel being returned from the injector rail. A shutoff valve can be included in the degassing column so that a "hydraulic lock" condition can be had and fuel will not pass out of the column when the system is used under unusual operating conditions or that the tank can be operated with insufficient fuel pressure for short periods. A temperature regulating heat exchanging coil is provided to aid in maintaining the fuel at a "constant" (e.g., within set limits) temperature. This can be thermostatically controlled, as herein described and as shown in the drawings. Also, an automatic safety bypass valve is shown to insure an uninterrupted flow of fuel flow if the pressure drop through the engine filters, check valve and/or fuel flow sensor should become too high.

The fuel fresh from the supply source is warmed in its mixing contact with the returning fuel and this warming brings entrained air out of the fuel. A significant portion of the return fuel volume can be aerated by combustion gases. The degassing column permits a venting of this gas.

The tank also permits the fuel returning from the injector rail to slow sufficiently so that particulate matter returning from the rail will have an opportunity to settle out.

Finally, the tank permits the use of a single one-way fuel sensor located in the fuel line between the fuel tank source and the conditioning tank. The volume of fuel passing through this sensor is the volume of fuel actually being burned since recirculation of the fuel around the injector rail takes place "downstream" of the sensor itself. Because only one sensor is used on fuel of uniform temperature and because no attempt is made to quantify any volume of the aerated fuel, an accurate and consistent reading of the fuel volume used can be obtained.

What is also provided is a vehicular fuel consumption monitor which has particular applicability to vehicles under changing environmental conditions; for instance, a boat at sea. The indicator system accepts inputs from transducers yielding pulse rate data indicating fuel consumption, engine RPMs and vehicular speed. The system calculates accurate and timely rate data such as Engine RPMs, gallons per hour gallons per mile and speed along with totals such as distance traveled, engine hours, fuel used and fuel remaining. The user can vary the time base or time interval used by the monitor for data collection so that abrupt changes in environmental conditions can be either highlighted by a relatively short time base or averaged by a relatively long time base. That is, the user can vary the time under which the data is accepted for any given rate calculation. Since conditions affecting the calculations often vary within the averaging interval used, the monitor is capable of providing the latest data received with the greatest weight in calculation. Input data falling outside the parameters of any measured time interval is not "discarded" but is continually averaged with prior and succeeding data. Further, the intervals used as a basis for calculation are logarithmically expanded, e.g., each interval is approximately twice as big as the succeeding interval. This is because wind pressure, and hence wave height, grows to the log of wind speed. Engine power output, and horsepower train surging, grows to the log of the change in engine RPM (propeller "law" curve).

DESCRIPTION OF PREFERRED EMBODIMENTS

Figure 1:
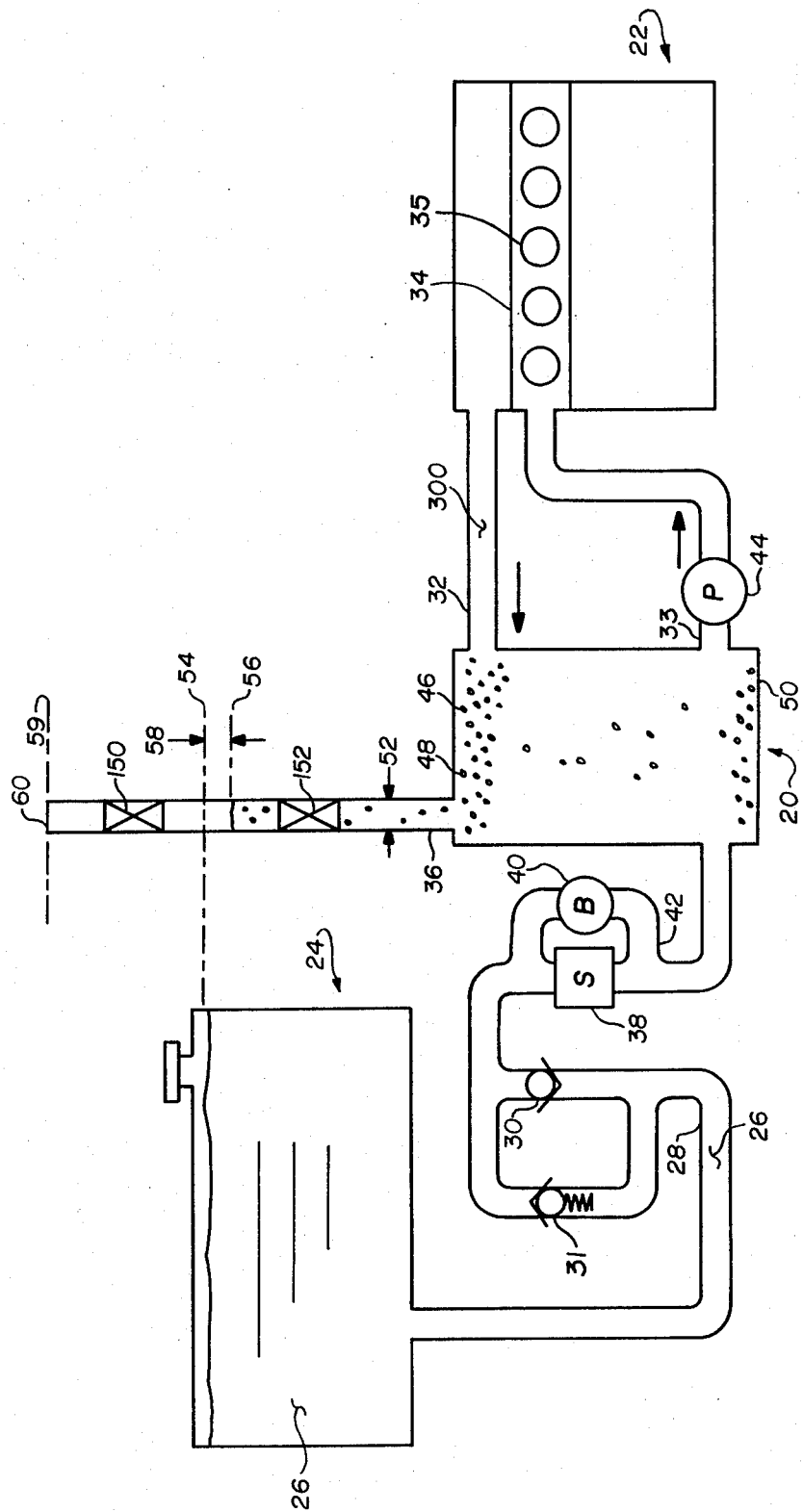
FIG. 1 shows the fuel conditioning and monitoring system of this invention.

Referring to the drawings wherein like numbers refer to like parts, FIG. 1 shows a conditioning tank 20 which is used to facilitate measuring fuel consumption and predicting performance of a diesel engine 22. Fuel 26 is gravity-fed from a supply tank 24 through intake line 28 to the fuel conditioning tank 20. Conditioning tank 20 has fuel output and return lines, 33 and 32 respectively through which fuel is brought to and back from the injector rail 34 of diesel engine 22. A degassing column 36 vents gases released from the fuel in tank 20.

The fuel 26 which gravity-feeds from supply tank 24 passes through a check valve 30 in intake line 28. This check valve 30 prevents back surges of fuel toward the supply tank 24. Parts of tank 20 can be of an elastic material (such as "BUNA-N" rubber or thin steel) to allow "smoothing" of fuel flow surges from various causes during "hydraulic-lock" system operation as hereinafter explained. A second check valve 31 with a release or "cracking" pressure of five PSI is placed in parallel with the low pressure cracking check valve 30 (open pressure less than one ounce preferred, such as a balanced "swing" check valve), and in an opposite flow direction to check valve 30. Check valve 31 allows the bleedback of excess pressure over five PSI greater than the input fuel pressure from conditioning tank 20. Such a pressurizing case could occur and could be dangerous if degassing column 36 would become closed and the fuel 26 would boil or if engine combustion gas would become trapped (e.g., blown injector tip) and accumulate pressure in tank 20 to hazardous levels. The fuel 26 then passes through a flow transducer or sensor 38 and thence into the conditioning tank 20. The fuel sensor 38 may be of the types commonly known in the art as "turbine" fluid flow sensors or "positive displacement" type fuel sensors. In case of any blockage of sensor 38, the fuel is able to automatically bypass sensor 38 by means of bypass valve 40 and bypass line 42.

When fuel 26 arrives in tank 20, it is immediately mixed with fuel 300 which is returning in a heated condition from the injector rail 34 of diesel engine 22. The intermixing of fuel 300 with fuel 26 causes a temperature balancing between the relatively hot fuel 300 and the relatively cool fuel 26. The heating of fuel 26 causes it to release any entrained air prior to its being pumped to the injector rail 34. The cooling of fuel 300 causes it to become temperature balanced with fuel 26 so that the mixture passing to the injector rail 34 has a more even temperature and viscosity. The decrease of the input fuel viscosity due to temperature rise causes particulates to settle out to the bottom 50 of tank 20 faster than if the fuel was at a lower temperature and therefore more viscous. Pump 44 brings this temperature balanced fuel through a port slightly above tank 50 (say 2 inches) and line 33 to the injector rail 34 of engine 22. From the injector rail 34, some of the fuel is injected and combusted. The remainder of the fuel may receive combustion particles and aeration in the form of combustion gases as a result of leakage through the injector tips. Metallic particles from pumping devices and other conglomerate materials from leaking gaskets and disintegrating components can also be shed into the fuel rail system. The injector rail 34 also dissipates heat to the fuel not combusted. Fuel return line 32 brings this returning fuel 300 back to the tank 20 in response to a positive pressure from pump 44.

Having thus been heated, aerated and charged with particulates, the returning fuel 300 passes into conditioning tank 20. Tank 20 serves to reduce the flow velocity components of fuel 300 at once so that the entrained combustion gases 48 can be released for venting through degassing column 36. The slowing of the fuel also causes particulates 46 water droplets and sludge (not shown) to settle to the tank bottom 50. Prior to being pumped once again by pump 44 through line 33, the fuel is intermixed with cool input fuel 26 so that an even viscosity of fuel passing to the injectors 35 is attained.

Degassing column 36 has a diameter 52 of sufficient size so that the largest bubble or aggregation of bubbles of combustion gases 48 will pass easily through the column. A slight distance 58 separates the highest possible level 54 of fuel in supply tank 24 from the highest possible level 56 of fuel in column 36. Distance 58 represents the pressure drop due to continuous fuel flow responsive to the engine 22 demand through output line 33, injector rail 34 and return line 32. Knowing these levels, one can ascertain the best level 59 for a port 60 in column 36 to vent the combustion gases to the atmosphere. Column 26 may be made of steel, or a clear material to allow the observer to compare fuel level in tank 26 with column height 56 and ascertain fuel pressure at engine load (and fuel flow) into mixing tank 20.

In particular, the preferred tank 20 has a fuel capacity greater than what engine 22 can consume in one minute of full load operation. The preferred tank 20 also has a vertical fuel current drop from the level of return line 32 to the level of output line 33 of less than one foot per second (#2 diesel fuel at 110° F., 1 centistoke viscosity). The preferred degassing column 36 has a diameter 52 which is at least four times larger than the largest aggregate bubble mass which it must pass. This sizing is done in order to prevent an "air-lift" or pneumatic pumping effect. In a case where the fuel level 54 must be drawn down such that fuel level 56 will fall below the input line 33, and therefore starve the engine, the column 36 may also be closed by using a shutoff valve 150 as that shown in FIG. 1. A valve 150 can be of the float type which will respond to rising fluid levels towards the column top by closing the column. This type of valve 150 will also close the column if the supply tank 24 is lifted high enough, relative the degassing port 60, to pump fuel from port 60. This might occur in a boat riding severe wave conditions with a fuel tank 24.

A shutoff valve 152 can be provided close to the top of tank 20 to help prevent low levels of fuel within the tank 20. Shutoff valve 152 will respond to a level of fuel 56 which drops below the valve 152 by closing the column 36. The subsequent "hydraulic lock" created by closing column 36 will tend to draw the fuel from the tank 24 to raise the level of fuel within tank 20. Valve 152 can also be operated manually if the system user desires at any time to draw more positively upon fuel within tank 24. The closing of valves 150 and 152 are temporary measures and cannot sustain engine operation for long periods when injectors 35 are degassing into injector rail 34 and filling tank 20 with gas.

Figure 2:
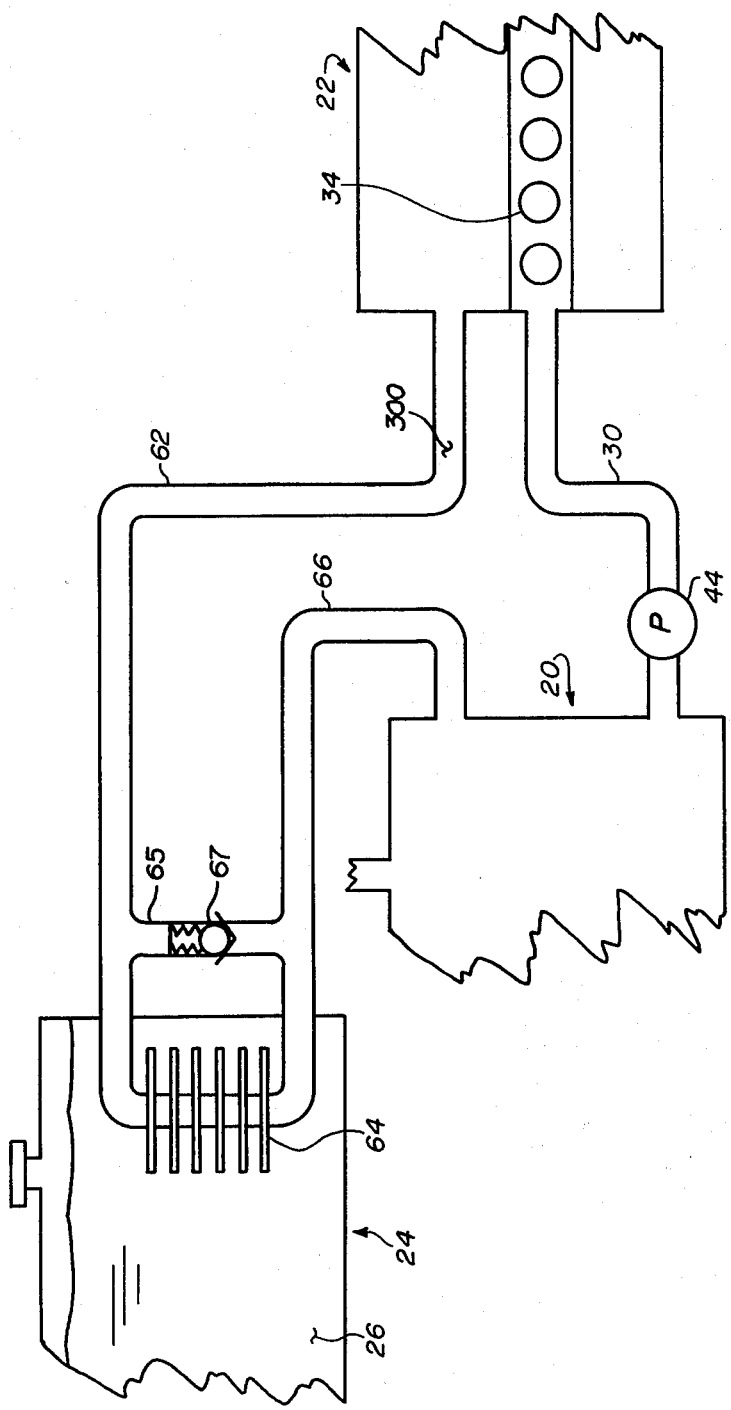
FIG. 2 shows a means for cooling the fuel prior to its passing back into the conditioning tank.

FIG. 2 shows one means which may be used to cool returning fuel 300 prior to its passing into tank 20. The embodiment is ideally suited to applications where the supply tank 24, engine 22 and conditioning tank 20 can be installed in close proximity to each other. An exchanger supply line 62 brings hot aerated fuel 300 from the injector rail 34 to a heat exchanger 64. The heat exchanger 64 is fixed within supply tank 24 and the heat of the returning fuel 300 is largely dissipated through the fuel 26 in tank 24. The exchanger return line 66 brings the cooled return fuel back to the conditioning tank 20. Temperature in tank 20 can be controlled by manually bypassing exchanger 64 by a line 65 and locating a valve 67 in line 65 to control a parallel bypass flow of fuel. This valve may be manually controlled or may be the temperature seeking or "thermostatic" control types.

Figure 3:
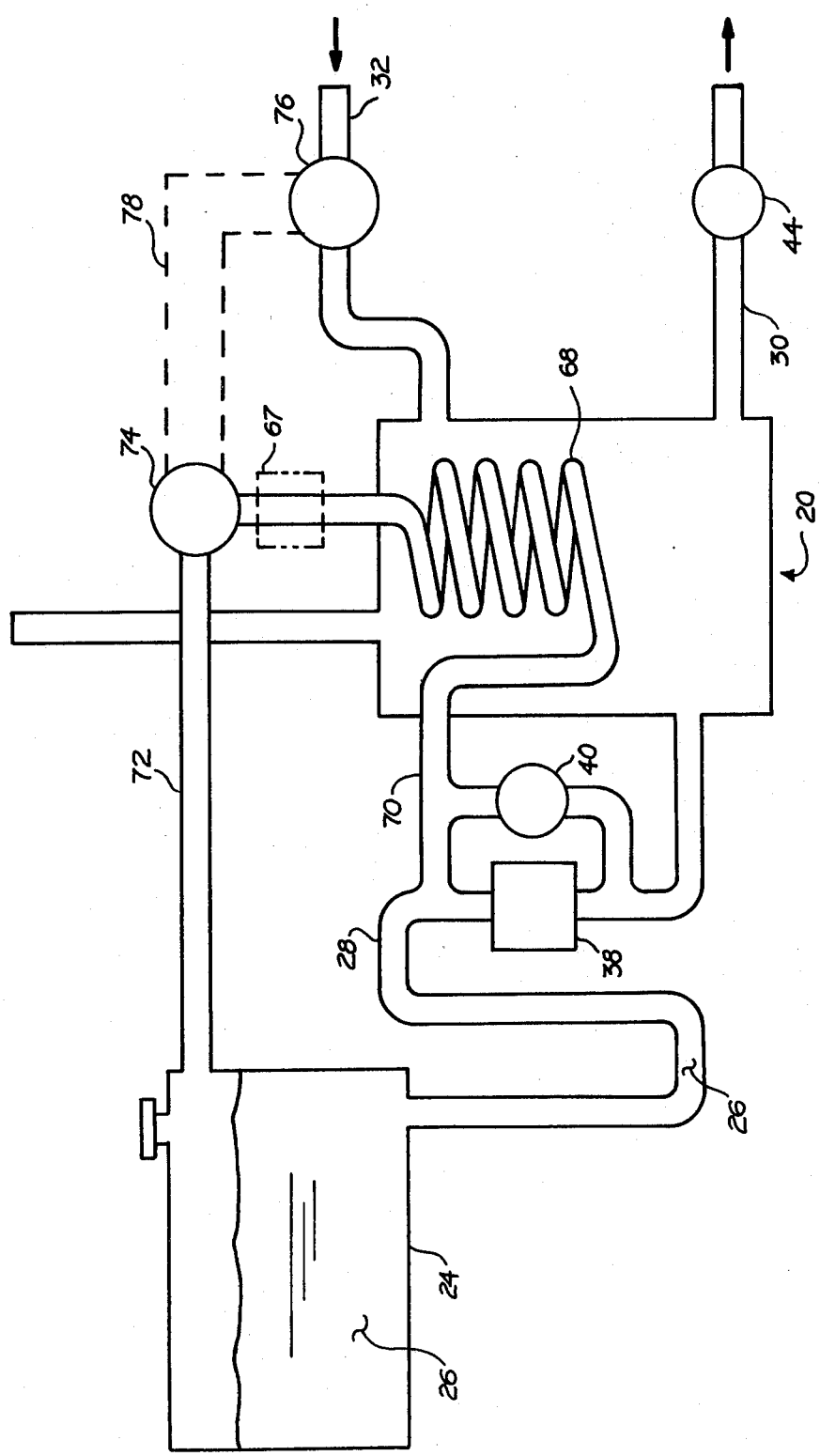
FIG. 3 shows a means for an active cooling of fuel within the conditioning tank.

FIG. 3 discloses a means whereby the fuel within tank 20 may be actively cooled without the danger of the fuel being contaminated by any coolant solution. A coil 68 is fixed within the tank 20 so that, during normal engine operation, the coil 68 remains completely immersed in fuel. A coil intake line 70 communicates with the fuel intake line 28 ahead of the flow sensor 38 and the bypass valve 40. A portion of the fuel 26 passing through intake line 28 will be thus diverted into coil intake line 70 and coil 68. In passing through the turns of coil 68, the fuel 26 will gather heat from the fuel within tank 20. A pump 74 may be placed in coil output line 72 to assist in bringing the diesel fuel used as coolant in coil 68 back to the supply tank 24. A self-contained system may be created by empowering pump 74 from a turbine 76. The turbine 76 would turn in response to the fuel flow through line 32 which is produced by pump 44. A mechanical linkage 78 consisting of a driving shaft, belts or gears as well known in the prior art, could be used. The temperature of fuel in tank 20 can be controlled by "clutching" of linkage 78 to reduce fluid flow in coil 68, or by placing a valve 67 in coil 68 to manually control flow rate. Valve 67 can also be a thermostatic automatic temperature control valve. Other equivalent means may be employed to vary the flow of fluid in coil 67 to control this temperature of the fuel in tank 20. Also, other heat rejection means such as "plate" heat exchangers and other means normally found in the art may be incorporated without departing from the invention.

Figure 4:
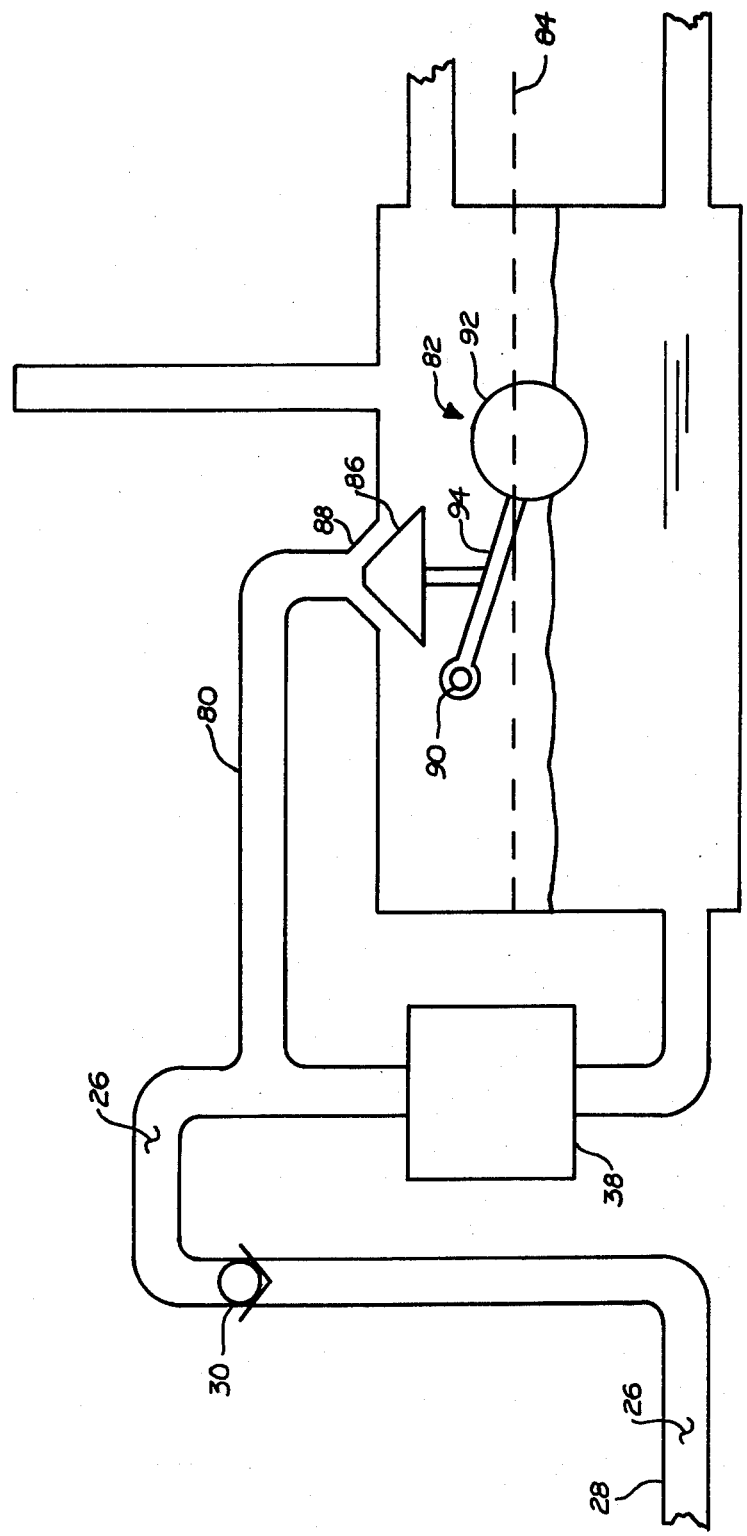
FIG. 4 shows a float-actuated sensor bypass valve.

FIG. 4 discloses a means for a float-activated automatic bypass valve. A bypass line 80 communicates with the fuel 26 in intake line 28 ahead of sensor 38. A float assembly 82, in response to a fuel level falling below the preferred level of 84 will cause a valve 86 to unseat from the surface 88 of line 80. During normal engine operation, the gravity flow of diesel fuel from tank 24 will sustain the gravity pressure head as shown in FIG. 1 and the bypass will not be needed. However, if sensor 38 becomes clogged, some means is necessary for sustaining engine operation, and the assembly as shown in Figure may be used.

The float assembly 82 is comprised of the parts of a typical float actuated valve. An arm 94 supports float 92 and valve 86 and the hinge 90 permits the rotation of arm 94. An advantage of this bypass embodiment is that the bypass is automatic and dependent primarily upon the drop of fuel level in tank 20 and not upon any back pressure caused by a plugging of sensor 38.

Figure 5:
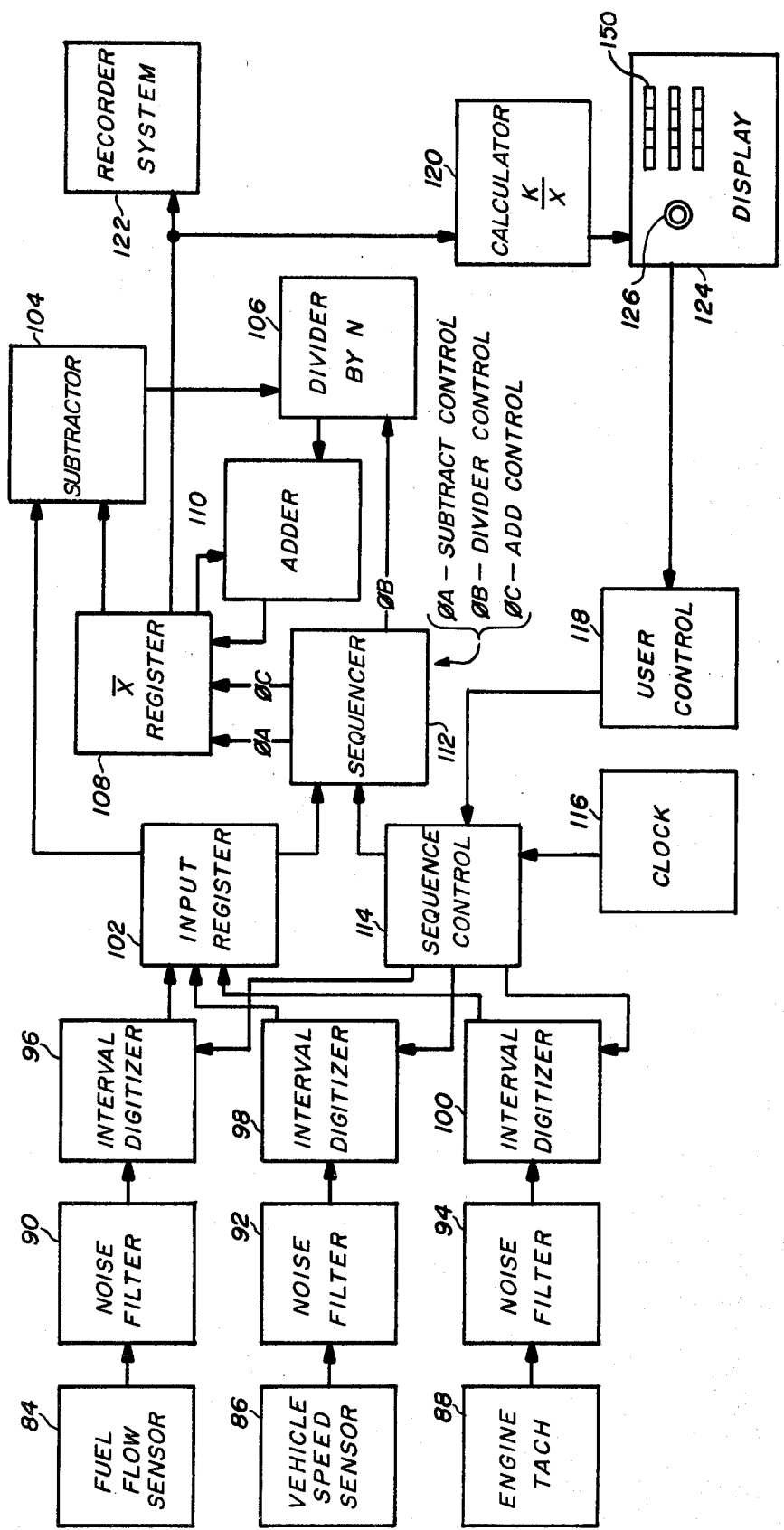
FIG. 5 shows a schematic of the monitoring system of this invention.

The vehicular fuel consumption monitor of this invention is shown in FIG. 5. The fuel use sensor shown as 38 in FIG. 4 and 84 in FIG. 5, provides an input signal representative of the fuel consumption rate of the vehicle's engine. The input signal passes from the sensor 84 through a noise filter 90 and an input interval digitizer 96, thence to an input register 102. The input interval digitizer 96, as controlled by the clock 116 and user control 118 through the sequence control 114 in turn controls the routing of pulses representing event periods into the input register 102.

The user, by means of user control 118 manually selects the period over which the input data is averaged. The data averaging period, in the preferred embodiment, is logarithmically weighted in steps to correspond to the natural harmonic progression of wave phenomena (e.g., a simple interval averaging of step 1 is one-half of step 2, and step 2 is one-half of step 3, etc.). Data is continually stored by the input register 102 and the user, by turning operating control 126 on the panel 124 is able to stepwise vary the time interval over which data is accepted for calculation. The time base command is issued to the sequence control 114 and thence passes to the sequencer 112. As the event periods, which are timed by the clock 116, reach the input register 102, these event periods are routed at the proper time by sequencer 112 to a subtractor 104. An immediately previous average of event periods is directed from the register 108 by the sequencer 112 to be subtracted from the new event period in the subtractor 104. The difference is directed to a divider 106 which divides the difference by a number N which represents the number of event periods timed as commanded by the sequencer 112, user control 118 and knob 126. The quotient of the division at 106 is added by adder 110 to the previously calculated average in the register 108. The sum is sent back to the register 108 to serve as the latest calculated average.

The new average is directed to a calculator 120 which divides the latest calculated average into a calibration factor K. The quotient, which has been converted to a usable form by the K division, is sent to the display 150. The step wherein the average is civided by a calibration factor can be excluded if it is desired to store the average directly in a recorder 122. The calculator is also capable of showing to the user through the display the totals of engine hours, distance traveled, fuel used and fuel remaining. The vehicle speed sensor 86 and engine tachometer 88 have respective noise filters 92 and 94 and respective input interval digitizers 98 and 100 which, as hereinbefore described for the fuel use sensor 84, feed period data to the input register 102.

I claim:

1. A system for degassing and temperature balancing of cool intake fuel and heated, non-combusted fuel returning from fuel injector means of a diesel engine, the heated fuel being aerated by combustion gases from the engine, said system comprising a fuel line through which fuel passes to said fuel injector means, a fuel return line through which fuel passes from said fuel injector means, a fuel supply, fuel conditioning means having a fuel reservoir and fuel intake and output ports, respectively communicating with the fuel supply and the fuel line for passing all fuel from the supply to the engine through the reservoir, fuel return port means connected to the fuel return line for returning the heated and aerated fuel from the engine to the fuel conditioning means, degassing column means having a lower end communicating with the fuel reservoir and an upper open end spaced above the fuel conditioning means for venting gases in the cool intake fuel and the heated and aerated fuel to atmosphere, means for sensing flow rate of the intake fuel passing from the fuel supply to the fuel conditioning means and means for bypassing the intake fuel from said fuel supply around said sensing means to said conditioning means.

2. A system for degassing and temperature balancing of cool intake fuel and heated, non-combusted fuel returning from fuel injector means of a diesel engine, the heated fuel being aerated by combustion gases from the engine, said system comprising a fuel line through which fuel passes to said fuel injector means, a fuel return line through which fuel passes from said fuel injector means, a fuel supply, fuel conditioning means having a fuel reservoir and fuel intake and output ports, respectively communicating with the fuel supply and the fuel line for passing all fuel from the supply to the engine through the reservoir, fuel return port means connected to the fuel return line for returning the heated and aerated fuel from the engine to the fuel conditioning means, degassing column means having a lower end communicating with the fuel reservoir and an upper open end spaced above the fuel conditioning means for venting gases in the cool intake fuel and the heated and aerated fuel to atmosphere and fuel cooling means located in the fuel return line intermediate the engine and conditioning means, said cooling means comprising a cooling line carrying said heated aerated non-combusted fuel from said engine, and heat exchange means located in said fuel supply to which said cooling line is connected for returning said fuel to said return line.

3. A system for degassing and temperature balancing of cool intake fuel and heated, non-combusted fuel returning from fuel injector means of a diesel engine, the heated fuel being aerated by combustion gases from the engine, said system comprising a fuel line through which fuel passes to said fuel injector means, a fuel return line through which fuel passes from said fuel injector means, a fuel supply, fuel conditioning means having a fuel reservoir and fuel intake and output ports, respectively communicating with the fuel supply and the fuel line for passing all fuel from the supply to the engine through the reservoir, fuel return port means connected to the fuel conditioning means for returning the heated and aerated fuel from the engine to the fuel conditioning means, degassing column means having a lower end communicating with the fuel reservoir and an upper open end spaced above the fuel conditioning means for venting gases in the cool intake fuel and the heated and aerated fuel to atmosphere, fuel cooling means located in the fuel return line intermediate the engine and the conditioning means for cooling the heated fuel at a regulated rate and a heat exchanger having opposite ends respectively connected with said fuel intake line between said fuel supply and the intake port, and with said fuel supply so that diesel fuel is routed from said intake line through said heat exchanger and returned to said fuel supply.

4. The device of claim 3 further comprising; a pumping means for pumping fuel from said heat exchanger to said fuel supply.

5. A system for degassing and temperature balancing of cool intake fuel and heated, non-combusted fuel returning from fuel injector means of a diesel engine, the heated fuel being aerated by combustion gases from the engine, said system comprising a fuel line through which fuel passes to said fuel injector means, a fuel supply, fuel conditioning means having a fuel reservoir and fuel intake and output ports, respectively communicating with the fuel supply and the fuel line for passing all fuel from the supply to the engine through the reservoir, fuel return port means connected to the fuel return line for returning the heated and aerated fuel from the engine to the fuel conditioning means, degassing column means having a lower end communicating with the fuel reservoir and an upper open end spaced above the fuel conditioning means for venting gases in the cool intake fuel and the heated and aerated fuel to atmosphere, means for sensing flow rate of the intake fuel passing from the fuel supply to the fuel conditioning means, bypass means connected between said fuel supply and said sensing means for routing the intake fuel to said conditioning means and float valve means responsive to a predetermined level of fuel within said conditioning means for opening and closing the bypass means.

6. The device of claim 5 further comprising; means for sensing rotational speed of the engine, means for calculating rates representative of the sensed rotational speed and means for recording said representative rates.

7. The device of claim 5 further comprising means responsive to recurring events for generating pulses defining event periods, means for subtracting a weighted average of previous event periods from a latest period to obtain a difference;
means for dividing said difference by the number of timed event periods to produce a quotient;
means for adding said quotient to said previously obtained weighted average to obtain a new weighted average;
clock means generating clock pulses at a known frequency for controlling the sequence of said subtraction, division and addition; and
storage means for storing each weighted average.

8. The device of claim 5 wherein said sensing means has an output that is digital in character.

9. The device of claim 5 further comprising; calculating means for calculating and totaling vehicle distance travelled, fuel used in gallons per mile, range remaining and fuel remaining.

10. In combination with an internal combustion engine having a fuel injector, a source of intake fuel, fuel supply and return conduits connected to the fuel injector, a fuel conditioning tank interconnected with said source and the conduits within which the intake fuel is mixed with heated fuel conducted from the fuel injector through the return conduit and a device for degassing the mixed fuel supplied from the conditioning tank to the fuel injector through the fuel supply conduit, the improvement residing in means for conducting a continuous inflow of all of the intake fuel to the conditioning tank, said degassing device including hydrostatic column means connected to the conditioning tank for rise of the mixed fuel to a liquid column level above the conditioning tank and atmospheric vent means for venting gases rising from the mixed fuel in the conditioning tank through the column means to said liquid level.

11. The improvement as defined in calim 10 wherein the conditioning tank includes a settling portion below the fuel supply conduit within which particulates settle out of the mixed fuel.

12. The improvement as defined in claim 11 including sensor means for measuring inflow of the intake fuel to the conditioning tank through the continuous inflow conducting means.

13. The improvement as defined in claim 10 including sensor means for measuring inflow of the intake fuel to the conditioning tank through the continuous inflow conducting means.

14. The improvement as defined in claim 12 including means interconnecting the source and the continuous inflow conducting means for recirculating a portion of the intake fuel, and means connected to the recirculating means within the conditioning tank for cooling the mixed fuel by heat exchange with said recirculating portion of the intake fuel.

15. The improvement as defined in claim 14 wherein the recirculating means includes a recirculating pump and means responsive to flow of the heated fuel in the return conduit for driving the pump.

16. In combination with an internal combustion engine having a fuel injector, a source of intake fuel, fuel supply and return conduits connected to the fuel injector, a fuel conditioning tank interconnected with said source and the conduits within which the intake fuel is mixed with heated fuel conducted from the fuel injector through the return conduit, means for degassing the mixed fuel supplied from the fuel conditioning tank to the fuel injector through the fuel supply conduit, and means for conducting the intake fuel from the source to the conditioning tank, the improvement comprising means interconnecting the source and the conducting means for recirculating a portion of the intake fuel, and means connected to the recirculating means within the conditioning tank for cooling the mixed fuel by heat exchange with said recirculating portion of the intake fuel, the recirculating means including a recirculating pump and means responsive to flow of the heated fuel in the return conduit for driving the pump.

* * * * *